(12) United States Patent
Golding et al.

(10) Patent No.: US 6,323,807 B1
(45) Date of Patent: Nov. 27, 2001

(54) INDOOR NAVIGATION WITH WEARABLE PASSIVE SENSORS

(75) Inventors: Andrew R. Golding, Waltham; Neal B. Lesh, Cambridge, both of MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/506,480

(22) Filed: Feb. 17, 2000

(51) Int. Cl.$^7$ .................................................. G01S 5/02
(52) U.S. Cl. ..................... 342/419; 342/457; 701/207
(58) Field of Search ............................. 342/419, 457; 701/207

(56) References Cited

U.S. PATENT DOCUMENTS

| | | |
|---|---|---|
| 5,402,340 * | 3/1995 | White et al. . |
| 5,470,233 | 11/1995 | Fruchterman et al. ............. 434/112 |
| 5,726,660 | 3/1998 | Purdy et al. ...................... 342/357 |
| 5,798,733 | 8/1998 | Ethridge ........................... 342/357 |
| 5,828,321 | 10/1998 | Matsuzaki ......................... 340/988 |
| 5,902,347 | 5/1999 | Backman et al. .................. 701/200 |
| 5,940,346 | 8/1999 | Sadowsky et al. ................ 367/128 |
| 6,081,230 * | 6/2000 | Hoshino et al. ............... 342/357.06 |

OTHER PUBLICATIONS

Schmidt et al.; "Advanced Interaction in Context"; Lecture Notes in Science 1707, Gellersen Ed. ; First International Symposium, Sep. 1999. pp. 89–101.
"Low Voltage Temperature Sensors"; TMP35/TMP36/TMP37; Analog Devices.
"PCM–DAS 16/330 A/D Conversion Card"; ComputerBoards, Inc.
"Three–Axis Magnetic Sensor Hybird"; HMC2003; Honeywell Sensor Products.

* cited by examiner

Primary Examiner—Theodore M. Blum
(74) Attorney, Agent, or Firm—Dirk Brinkman

(57) ABSTRACT

A wearable device is configured for navigating in an indoor environment. The device includes passive sensors for measuring environmental physical conditions at known locations in the indoor environment and at an unknown locations in the indoor environment. A wearable computer is coupled to passive sensors. The computer is configured to construct a first statistical model of the environment according to the measured physical conditions at the known locations and a second statistical model of the environment according to the measured physical conditions at the unknown locations. Processing means of the computer determines a probability that the unknown locations correspond to the known locations by comparing the second statistical model to the first statistical model.

11 Claims, 5 Drawing Sheets

INDOOR NAVIGATION WITH WEARABLE PASSIVE SENSORS

FIELD OF THE INVENTION

This invention relates generally to wearable computing devices, and more particularly, to indoor navigation using wearable computing devices.

BACKGROUND OF THE INVENTION

For many applications of wearable computing devices, the ability to detect aspects of a user's internal or external state is essential. Generally, this is called context awareness.

Internal context aware computing has been used to detect a variety of aspects of a user's internal state. For example, sensors have measured psychological patterns of the user, such as expressions of joy or anger, and these psychological parameters have been correlated with physiological parameters such as heart rate and physical activity. Actigraphy, i.e., processed accelerometer readings, has been used for detailed and long-term measurement of hand tremors to help Parkinson patients manage their symptoms. Wearable computing devices have also been used for detecting when a person is sleeping, and for correlating between levels of activity and mood disorders, and attention-deficit hyperactivity disorder.

External context aware computing has been used in applications such as automated tour guides, and for people and animal tracking,. With automated tour guides, the wearable devices augment the user's view of attractions.

Wearable devices can also provide navigational assistance for visually impaired people. GPS information acquired by wearable devices has been used in context-aware computing to assist field workers track wild animals.

For the purpose of navigating, most prior art work has focused on rich and well understood sensors such as optical, vision, and audio sensors. For example, U.S. Pat. No. 5,793,483 describes an optical measurement system that includes an optical beam transmitter, and an optical beam detector to measure a distance between the transmitter and detector. U.S. Pat. No. 5,378,969 describes a system for controlling robot navigation that uses a map of the environment that was prepared in advance. In the map, shape features of objects are predesignated. The robot has a vision sensor. In its navigation, the robot recognizes its current position from the shape feature.

In the field of robot navigation, many systems also rely on sonar sensors, which are not appropriate for wearable systems where control of orientation is a problem.

For indoor navigation, GPS is difficult to use. U.S. Pat. No. 5,959,575, describes an interior GPS navigation method. There, ground transceivers transmit a pseudo-satellite signal which includes positional coordinates of the round transceiver. Active badges and systems based on beacons require the installation and maintenance of complex and expensive infrastructures.

It is desired to perform indoor navigation using only passive wearable sensors that rely entirely on naturally-occurring, signals. A challenge with this type of application, and other related ones, is that the raw sensor signals are often unsuitable for use as direct inputs to a machine-learning process to model an environment. The reason is that there is too great a statistical distance between the raw signals and the high-level inference that is to be made. One goal of the invention is to increase the likelihood that a correct inference is made.

SUMMARY OF THE INVENTION

The invention provides a wearable computing device for context awareness computing. More particularly, the wearable device according to the invention can be used for navigating an indoor environment. The wearable device includes passive sensors for measuring magnetic fields from steel beams in walls, floors, and ceilings of building, ambient light emitted from fixed arrangements of fluorescent lights, and temperature gradients across rooms. In addition, the passive sensors measure distinctive acceleration patterns due to ascending or descending staircases, riding, an escalator or elevator, simply walking, or counting the number of steps taken.

During a learning phase, the raw signals from the sensors are provided to a learning module. The signals are preprocessed to extract high-level features. These high-level features do not add new knowledge to the system. Instead, the features reformulate existing information into a form that is more effective for a machine-learning process. Once a model of the environment has been learned, the system can be used for navigation.

More particularly, a wearable device is configured for navigating, in an indoor environment. The device includes passive sensors for measuring environmental physical conditions at known locations in the indoor environment and at unknown locations in the indoor environment. A wearable computer is coupled to the passive sensors.

The computer is configured to construct a first statistical model of the environment according to the measured physical conditions at known locations and a second statistical model of the environment according to the measured physical conditions at the unknown locations. Processing means of the computer determine a probability that the unknown locations correspond to any of the known locations by comparing the second statistical model to the first statistical model.

DETAILED DESCRIPTION OF THE PREFERRED EMBODIMENT

System Overview

Figure 1:
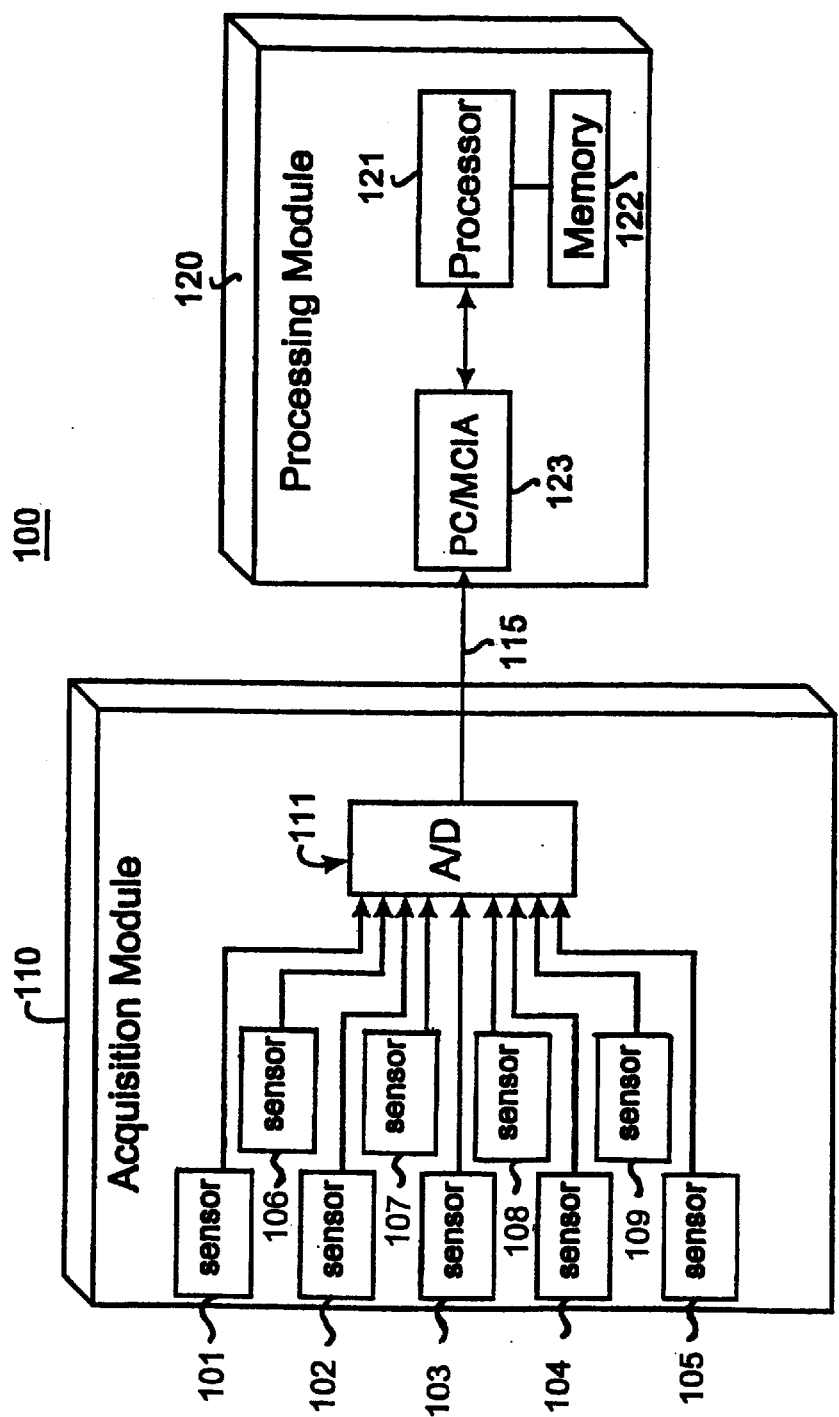
FIG. 1 is a block diagram of a wearable navigation system according to the invention.

FIG. 1 shows a wearable navigation system 100 according to our invention. The system includes a data acquisition module 110 and a data processing module 120. The acquisition module 110 includes a number of small, lightweight, low-power, cheap, passive and preferably non-directional sensors. Passive in the context of this description means that the sensor does not emit a signal; it only acquires signals.

The processing module 120 includes a processor 121 connected to a memory 122 and a bus 123 for connecting to I/O devices, e.g., a mouse, keyboard, display, etc. not shown, and the acquisition module. The processor module can execute application programs to implement the methods according to the invention. The intent of the system is to determine locations in an indoor environment from environmental measurements taken during training sessions.

The system 100 can be hand-held, worn on a belt, or attached to an article of clothing. The belt or other means for attachment provide a relatively fixed orientation between the sensors and a user to circumvent problems of orientation drift and directionality. The data processing module 120 can be a laptop, palmtop, or other similar small sized computing device. The acquisition module 110 can be integrated with the processing module, or interfaced to the processing module 120 by a cable 115, or infrared transceiver.

The sensors include an accelerometer 101, a magnetometer 102, a light detector 103, and a temperature sensor 104. The accelerometer measures acceleration in three dimensions (X, Y, and Z). The accelerometer can be implemented using, two 2D-accelerometer boards, for example, the ADXL-202 from Analog, Devices, Inc. For the magnetometer, we used the Honeywell HMC2003. The HMC2003 has three permalloy magneto-resistive transducers to measure the strength and direction of a magnetic field in three dimensions. For light detection we use a photodiode. The diode extracts the 60-Hz component of signals from a fluorescent light. We measure ambient room temperatures with a TMP37-GT9 from Analogy Devices, Inc.

Additional sensors can include a low-resolution camera 105 to measure average color and light intensity at a location, a humidity detector 106, a gyroscope 107 to measure tilt, a chemical detector 108, such as commercially available carbon monoxide detectors, to measure chemical gradients in the air, and an altimeter 109. Because of the feature extraction described below, we are less concerned with the sensitivity of the sensors. We prefer small, low cost, passive devices with minimal power consumption.

The analogy outputs from the sensors 101–109 are fed to an analog-to digital converter 111, such as the PCM-DAS-16/330 from ComputerBoards, Inc. The converter can interface to a standard computer bus such the PC/MCIA bus 123. The digitized signals can be sampled at a rate of roughly once every 50 msec.

Navigation System

Given the view of the environment measured by the sensors, the task of the processing module 120 is to first determine a model of an environment during a training phase. After the model is learned, the model can be used for indoor navigation.

Figure 2:
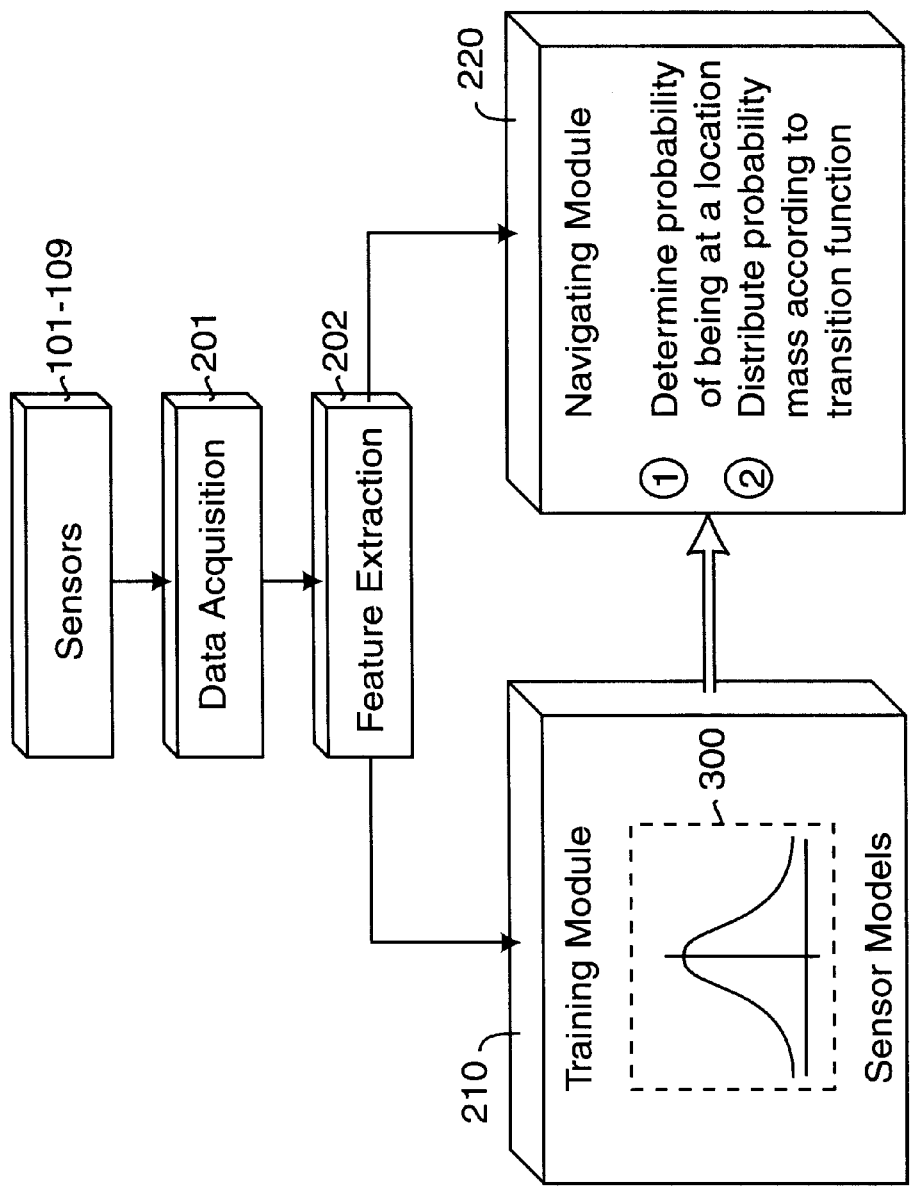
FIG. 2 is a flow diagram of processes used by the system of FIG. 1.

As shown in FIG. 2, the sensors 101–109 passively measure the environment as a user navigates through the environment. During data acquisition 201, N-tuples of samples are taken at 50 msec intervals, where N is equal to the number of sensors. The samples are converted to canonical units. Feature extraction 202, describes in greater detail below, extracts high level features from the raw signals. The sensors can be configured to only measure physical conditions within a predetermined range.

The following sections describe the modules in greater detail. We first describe the representation of the environment that our navigation system uses, and then we describe data acquisition, data modeling, and a navigation module. Because the feature extraction will be best understood in the context of how the navigation processes works, it is described last.

Representation of Environment

Figure 3:
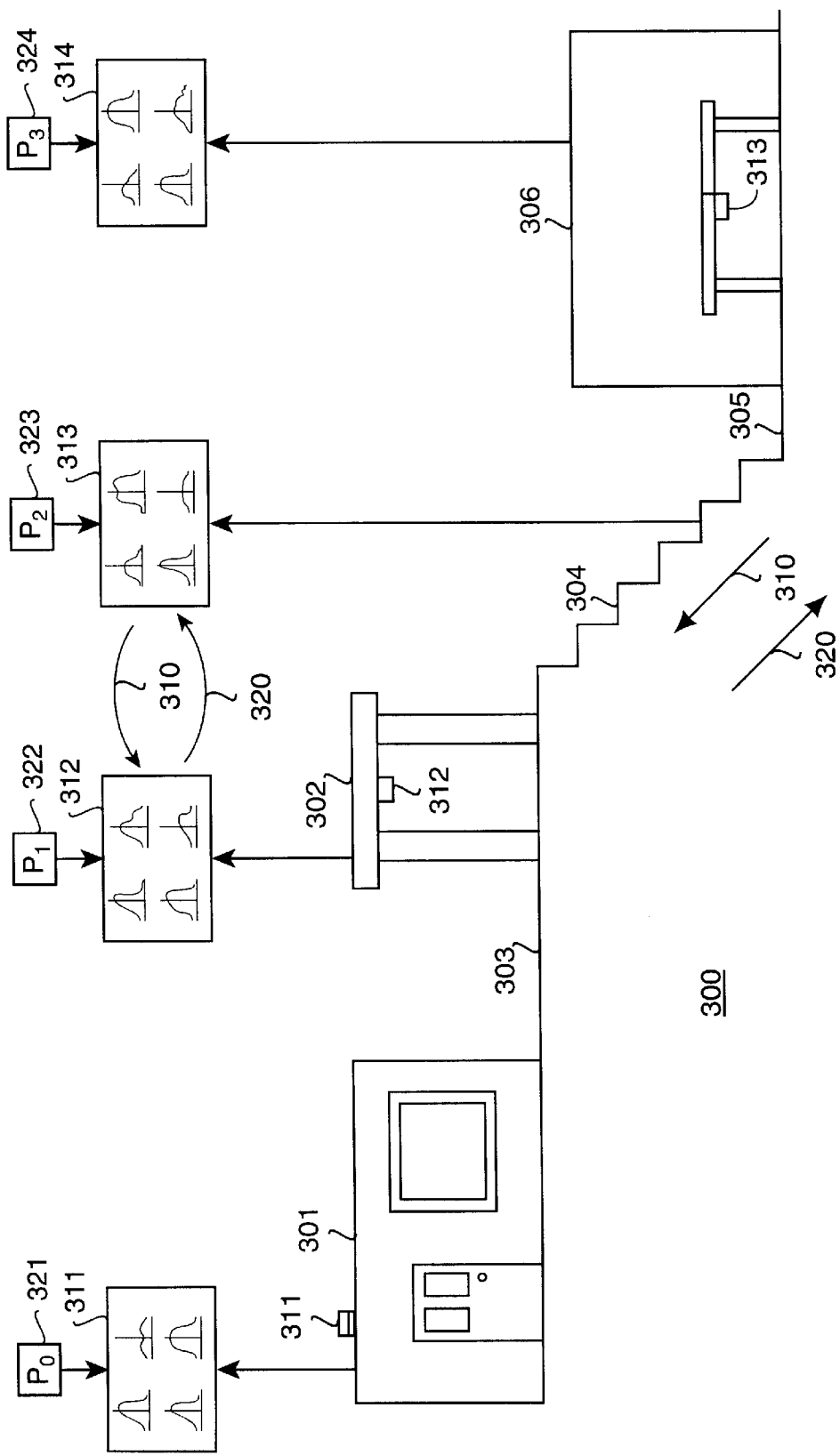
FIG. 3 is a model of an example environment to be navigated by the system of FIG. 1.

We formulate the navigation problem in terms of an indoor environment in which the navigation system operates. FIG. 3 shows an example indoor environment 300. The environment includes multiple "locations," for example, an office 301, an arch 302, an upstairs location 303, stairs 304, a downstairs location 305, and conference room 306. The locations are connected as shown. For example, the user can walk from the office through the arch to the stairs, and in fact, the user cannot (yet from the office to the stairs without going through the arch.

We put "locations" in quotes because the locations do not correspond to points in the physical environment, but rather to transitions between points. For example, the upstairs location corresponds to a transition 310 from the bottom of the stairs to the top. The upstairs location could more properly be called the going upstairs transition. This allows us to distinguish between upstairs and downstairs, which occupy the same physical space, but are nonetheless useful to discriminate. Going downstairs would entail a transition 320. Transitions between other locations can similarly be defined. We correspond each location as a directed transition from one location to another. A location such as the office 301 corresponds to starting in the office doorway, walking around inside the office, and returning to the doorway.

We associate statistical models 311–314 with each of the known locations. The models are in the form of the sensor data statistically represented as distributions described in greater detail below. Also associated with the locations are probabilities ($P_0, \ldots, P_3$) 321–324 of the user being at a location.

In an alternative embodiment, the environment 300 can be passively enriched. For example, RF transmitters 311–313 can be added at random locations. Each transmitter can be encoded with unique identifications. Note, the sensors for acquiring the identifications are passive like the rest of the environment. Then, during, training, the system "learns" the locations of the randomly dispersed transponders.

Data Acquisition

As stated above, during, data acquisition, samples are read and converted to canonical units every 50-msec. Table 1 lists nine sensors for four types of environmental physical conditions, and their canonical units of measurement.

TABLE 1

| Sensor | Description | Units |
| --- | --- | --- |
| Left X acc. | Acceleration to user's right | G |
| Left Y acc. | Acceleration forward | G |
| Right X acc. | Acceleration to user's left | G |
| Right Z acc. | Acceleration up | G |
| Compass X | Magnetic field to user's right | Gauss |
| Compass Y | Magnetic field forward | Gauss |
| Compass Z | Magnetic filed upward | Gauss |
| Temperature | Ambient temperature | degree |
| Light | Strength of 60 Hz component | volt |

Data Modeling

The navigation system first needs to learn the model 300 of the environment. More particularly, the model is determined from the sensor signals. This is done by the training module 210 during the initial training, phase.

Training proceeds as follows. The user is given a known itinerary to traverse through the environment and visit each of the known locations. With the navigation system 100 in training mode, the user proceeds along, the itinerary, pushing a button when entering each known location, and again when leaving, each location. In this way, the system is kept informed of the user's actual location in the environment. In addition, the system samples the sensors every 50 msec, and converts the samples to canonical units, and augmenting, the samples with extracted features, described below. The result is a set of training data in the form of a sequence of augmented sensor tuples, each accompanied by a training label that specifies the location at which the samples were collected. From these labeled tuples, for each sensor, the training module learns the statistical model 300 of the environment.

The model 300 represents the gross characteristics of each known location, for example, the characteristic that a large magnitude magnetometer reading, is measured at the arch location 302 of FIG. 3. This is because the arch is made of steel. Steel beams that are fixed in place tend to become magnetized over time due to vibrations that align the dipoles of the material. Accordingly, the data-modeling, module lumps together all readings for a given sensor at a given location, and constructs distributions of these readings.

The gross characteristics of the location show up in the shape of the distribution. For example, the magnetism of the arch will show up in the distribution of the Compass-Z samples with an elevated mean and standard deviation compared to the distribution of the Compass-Z samples at other locations. The standard deviation is elevated because the distribution at the arch will be "stretched" from very small values to very large values. The overall model of the environment produced by the training, module takes the form of a set of distributions over the possible values of the sensors. There is one distribution for each (sensor, location) pair.

The remaining question is what type of distribution will best model a set of sensor readings at a location. Two types of distributions can be used, continuous Gaussian distributions and discrete histograms. Gaussians are appropriate under the assumption that the observed sensor values are generated by the cumulative effect of numerous random processes. Histograms test this assumption by modeling the data without making any assumptions about the type of distribution. The key with histograms, of course, is choosing an appropriate width for each bin.

We use a cross-validation approach, which starts by splitting the set of observed sensor values into a training set and a holdout set. The intuition is that an appropriate bin width will form a histogram out of the training set using that bin width, then the histogram will be highly predictive of more data from the same distribution, namely, the holdout set. Thus, our method is to try a variety of bin widths, and to select a bin width w that maximizes the probability of the holdout set. The probability of the holdout set is calculated using, a histogram probability density function constructed from the training set with bin width w.

More specifically, we use leave-one-out cross-validation. That is, given n sensor values to model, we do n iterations, designating each value in turn as the singleton holdout set, and the remaining n−1 values as the training set. The probabilities of the holdout set from all iterations are combined by taking their product. We chose this style of cross-validation because it outperformed all other styles, e.g., two-way cross validation on synthetic datasets for which the true distribution is known.

Figure 4:
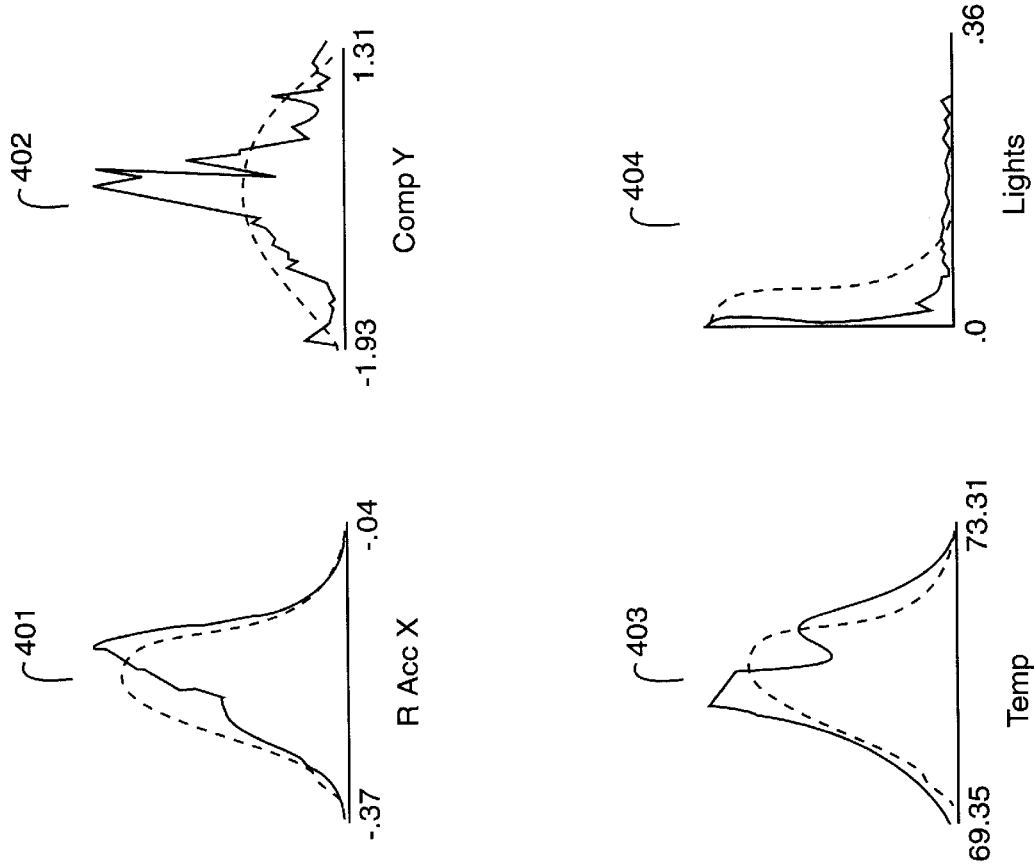
FIG. 4 are graphs of histograms and Gaussian distributions of samples from four sensors.

FIG. 4 shows examples of both Gaussian (dashed) and histogram (solid) distributions for the data from four sensors (right acceleration 401, compass Y 402, temperature 403, and lights 404, collected at the arch. Informally, it can be seen that the Gaussian approximation is reasonably well justified in most cases. We have therefore preferred Gaussian models over histograms because Gaussians can be represented in a more compact form, $$\frac{1}{\sqrt{2\pi}} e^{-x^2/2}.$$

Navigation

The navigation module 220 of FIG. 2 brings two types of knowledge to bear on the task of inferring the user's location. First, it has knowledge of the distribution of signal values throughout the environment, as learned by the training, module 210. For example, if large Compass-Z values are observed, then the module can infer that the user is likely to be at the arch. Second, the system has dead-reckoning knowledge. Dead-reckoning knowledge is rough knowledge about the user's change in position from one time step to the next, as inferred from accelerometer and compass readings. The assumption here is that the user can only move to an adjacent location.

The navigation module 220 incorporates these two types of knowledge in an iterative, Markov-model-like, two-step process as seen in FIG. 2. The process starts with an initial probability, e.g. $P_1$ 322 assigned to the user being, at any of the location in the environment. The initial probability can be determined by how well the current models fit any of the training models 311–314. Each time an augmented sensor tuple is read, the process incrementally updates these probabilities 321–324.

The first step of the update incorporates the sensor information. This is done using, Bayes' rule. If the augmented tuple of sensor readings is $S=\{s_1, \ldots, s_n\}$, then for each location l, determine the posterior probability that the user is at that location using Bayes' rule with the conditional independence assumption:

$$P(l | \langle s_1, \ldots, s_n \rangle) = \left( \prod_{1 \le i \le n} P(s_i | l) \right) \frac{P(l)}{P(\langle s_1, \ldots, s_n \rangle)}$$

The $P(s_i|l)$ terms are determined from the model 300 learned by the training module for the ith sensor at location l. The prior probability, $P(l)$, is the probability assigned to location l before the update. The $P(<s_1, \ldots, s_n>)$ term is omitted, instead we scale the probabilities for all locations to sum to 1.

The second step of the update incorporates the dead-reckoning information. This step attempts to transfer the probability mass in the same direction and distance that the user moved since the last sensor readings. For example, if we have dead-reckoning, information that the user moved from the current location by five feet to the east, then we would transfer 100% of the probability mass from each location to a location five feet to the east of it. In practice, of course, we have only rather vague dead-reckoning, information, and thus we are reduced to spreading out the probability mass in a less focused manner.

In particular, our current dead-reckoning information uses footstep detection. For example, we detect a footstep if, and only if, the Z-acceleration is greater than 0.05 G after being, less than 0.05 G for at least 250 msec. When a footstep is detected, we spread out probability mass from a location by retaining some fraction $p_{stay}$ of its probability at the location itself, and distributing the remaining $(1-p_{stay})$ fraction of its probability equally among, all adjacent locations. The value $p_{stay}$ is the probability that a single footstep will not carry the user outside of the current location, and is estimated from training data.

Feature Extraction

The preceding sections describe our basic training, and navigation processes. However, if we were to apply these basic processes to raw, unaugmented tuples of sensor readings, these processes would perform less than satisfactory. We improve the performance of our system by extracting features that add no new information at the knowledge level, but simply reformulate the existing information into a form in which it can be used more effectively.

Although we give specific examples of features that can be extracted, it should be understood that other features can also be extracted. One problem that should be apparent is that of overcounting evidence due to excessive independence assumptions in the Bayesian update part of the navigation process. Not only are all features in a tuple assumed to be conditionally independent, but consecutive tuples are assumed independent as well. Thus, should the user stand under a light, we find that the process quickly comes to believe the user is in whichever room is best-lit during training. The solution is to add a computed feature that triggers only when the lights go from off to on, rather than responding whenever the lights are on.

A second problem concerns absolute versus relative measurements. Sensor readings are often subject to drift for various reasons. For example, an accelerometer may shift around, thereby changing, the perceived value of gravity, which nominally has a Z-acceleration of −1 G. Clearly it is bad for the navigation module to depend on the absolute Z-accelerations that are read. To address this, we determine a feature which, for each accelerometer, reports the difference between the current value and a running average of the last, say, 10-minutes' worth of readings.

A third problem arises in the context of the Z-acceleration sensor. For example, when the user descends the stairs, the amplitude of the oscillations in the Z-acceleration increases. This effect does in fact show up when one looks at the distribution of Z-acceleration values for the downstairs location. This distribution has a wider shape than the Z-acceleration distributions for other locations. However, this is still not enough of a clue for the navigation process to latch onto easily. However, when we make the information about wider shape available directly by adding a computed feature for the variance of the Z-acceleration, then the process is able to reliably discriminate the downstairs location.

Figure 5:
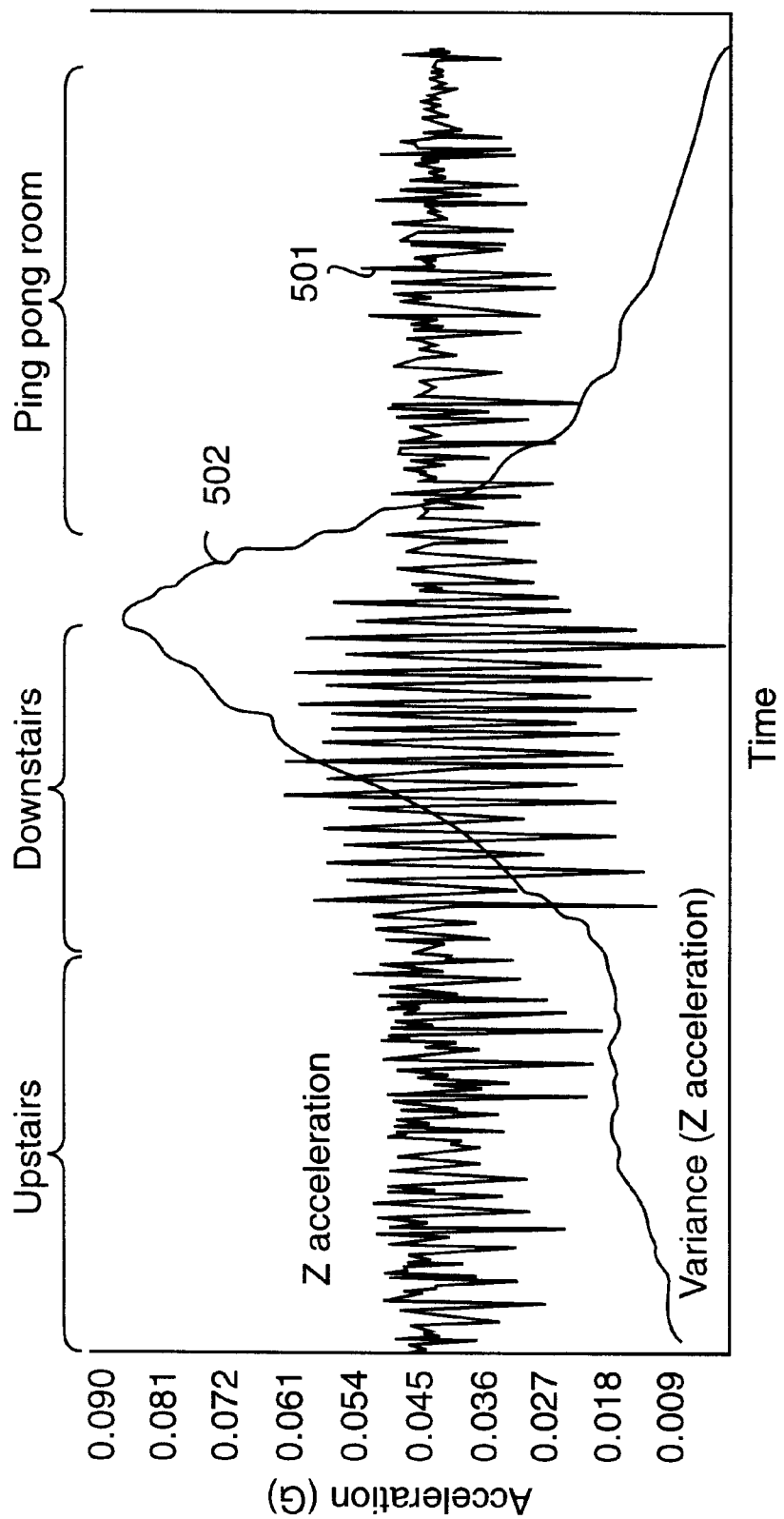
FIG. 5 are graphs correlating raw acceleration data with the variance of acceleration.

FIG. 5 shows the raw Z-acceleration data 501 together with the variance of Z-acceleration feature 502. The latter extracted feature is closely correlated with transitioning from upstairs to downstairs.

A final problem concerns noisy or unreliable sensor distributions, a difficulty which occurs frequently in the navigation domain. For example, the Compass-Z sensor often hovers in an intermediate range indicating a fairly weak magnetic field. Such a value is not particularly indicative of any location, yet the value will inevitably turn out to favor one location over another, perhaps by a small amount. Incorporating this kind of evidence into a process is never good. It introduces noise, and the noise does not always balance out across locations. There are several ways to clean up such evidence.

The approach we have adopted is to establish an in-bounds range for each sensor. If a particular sensor value falls outside this range, the value is ignored, i.e., the value is not used for performing Bayesian updates. For example, the Compass-Z in-bounds range is above 1.2-Gauss or below −1.2-Gauss. If a weak Compass-Z value is read, e.g., 0.3 Gauss, the value is discarded. That is, the process does not use this reading, of the Compass-Z sensor in the Bayesian update step. In one embodiment, the ranges are preset by hand. However, it should be understood that the ranges can be set and adjusted automatically.

Conclusion

The invention enables a wearable computer to be context-aware, specifically, to perform indoor navigation using a diverse set of passive, cheap, and wearable sensors. The signals obtained from accelerometers, magnetometers, and temperature and light sensors are applied to machine-learning processes to infer a user's location in an indoor environment. High level features are extracted from the signals to negate a high level of noise in the data. By obtaining high accuracy results, we have demonstrated that integrating information from a diverse set of low-level sensors is adequate to obtain enough raw knowledge to perform context-aware tasks such as indoor navigation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for navigating in an indoor environment using a weareable computer device having a plurality of sensors, comprising the steps of:

measuring a plurality of environmental physical conditions with passive sensors at a plurality of known locations in the environment;

constructing a first statistical model of the environment according to the measured physical conditions;

measuring the plurality of environmental physical conditions at unknown locations in the environment;

constructing a second statistical model of the environment according to the measured physical conditions;

determining a probability that the unknown location corresponds to any of the known locations by comparing the second statistical model to the first statistical model.

2. The method of claim 1 wherein the plurality of passive sensors include an accelerometer, a magnetometer, a light detector, and a temperature sensor.

3. The method of claim 1 wherein the statistical model represents the measured physical conditions as Gaussian probability distribution functions.

4. The method of claim 1 wherein navigation is performed by determining a probability of transitioning between the locations according to the statistical model.

5. The method of claim 1 wherein the measured physical conditions at each location l are given as readings are $S=\{s_1, \ldots, s_n\}$, and a posterior probability that the unknown location is the known location l is estimated using Baye's rule with a conditional independence assumption:

$$P(l\,|\,\langle s_1,\ldots,s_n\rangle) = \left(\prod_{1\le i\le n} P(s_i\,|\,l)\right)\frac{P(l)}{P(\langle s_1,\ldots,s_n\rangle)}$$

where P(s$_i$|l) terms are determined from the first statistical model.

6. The method of claim 4 wherein the probability of transitioning between locations uses dead-reckoning information obtained from an accelerometer.

7. The method of claim 1 further comprising the step of:
extracting, high level features from the measured physical conditions.

8. The method of claim 1 wherein the plurality of passive sensors are non-directional.

9. The method of claim 1 wherein the environment includes radio frequency transponders, and wherein the passive sensors include a radio receiver.

10. The method of claim 1 wherein the first and second statistical models only consider measured physical conditions within a predetermined range.

11. An apparatus for navigating in an indoor environment, comprising:

a plurality of passive sensors for measuring a plurality of environmental physical conditions at a plurality of known locations in the indoor environment, and at an unknown location in the indoor environment;

a wearable computer device coupled to the plurality of passive sensors configured to construct a first statistical model of the environment according to the measured physical conditions at the plurality of known locations and a second statistical model of the environment according to the measured physical conditions at the unknown locations; and means for determining a probability that the unknown location corresponds to one of the known locations by comparing the second statistical model to the first statistical model.

* * * * *